United States Patent [19]
Anderson et al.

[11] Patent Number: 5,140,674
[45] Date of Patent: Aug. 18, 1992

[54] TEXT AND COLOR PRINTING SYSTEM

[75] Inventors: Stephen R. Anderson, Mountain View; Wen-Tsing Chen, Cupertino; John P. Ertel, Portola Valley; William D. Holland, Palo Alto; Rueiming Jamp; Lawrence LaBarre, both of Mountain View; Steven W. Lee, Palo Alto; Kent D. Vincent, Cupertino, all of Calif.

[73] Assignee: Hewlett-Packard Company, Palo Alto, Calif.

[21] Appl. No.: 614,571

[22] Filed: Oct. 31, 1990

Related U.S. Application Data

[63] Continuation of Ser. No. 248,886, Sep. 23, 1988, abandoned.

[51] Int. Cl.$^5$ ............................................. G03F 3/12
[52] U.S. Cl. ................................... 395/111; 395/112; 395/117; 400/63
[58] Field of Search ............... 364/518, 519; 400/63, 400/83; 395/111, 112, 117

[56] References Cited

U.S. PATENT DOCUMENTS

| | | | |
|---|---|---|---|
| 4,682,190 | 7/1987 | Ikeda | 346/154 |
| 4,712,909 | 12/1987 | Oshikoshi | 355/20 |
| 4,763,241 | 8/1988 | Egawa et al. | 346/154 |
| 4,789,147 | 12/1988 | Berger et al. | 270/1.1 |
| 5,001,653 | 3/1991 | Buchanan et al. | 364/523 |

Primary Examiner—Gary V. Harkcom
Assistant Examiner—Phu K. Nguyen

[57] ABSTRACT

A desktop printing system for use with microprocessor-based computers includes the modular combination of a color printer and a monochrome text printer. Preferably, the color printer is of the type which prints color graphics incrementally and the text printer is of the type which prints monochrome text continuously. In operation, printing information is segregated into color and text components, and the color printer is controlled to print only color components while the text printer is controlled to print only monochrome text components.

33 Claims, 2 Drawing Sheets

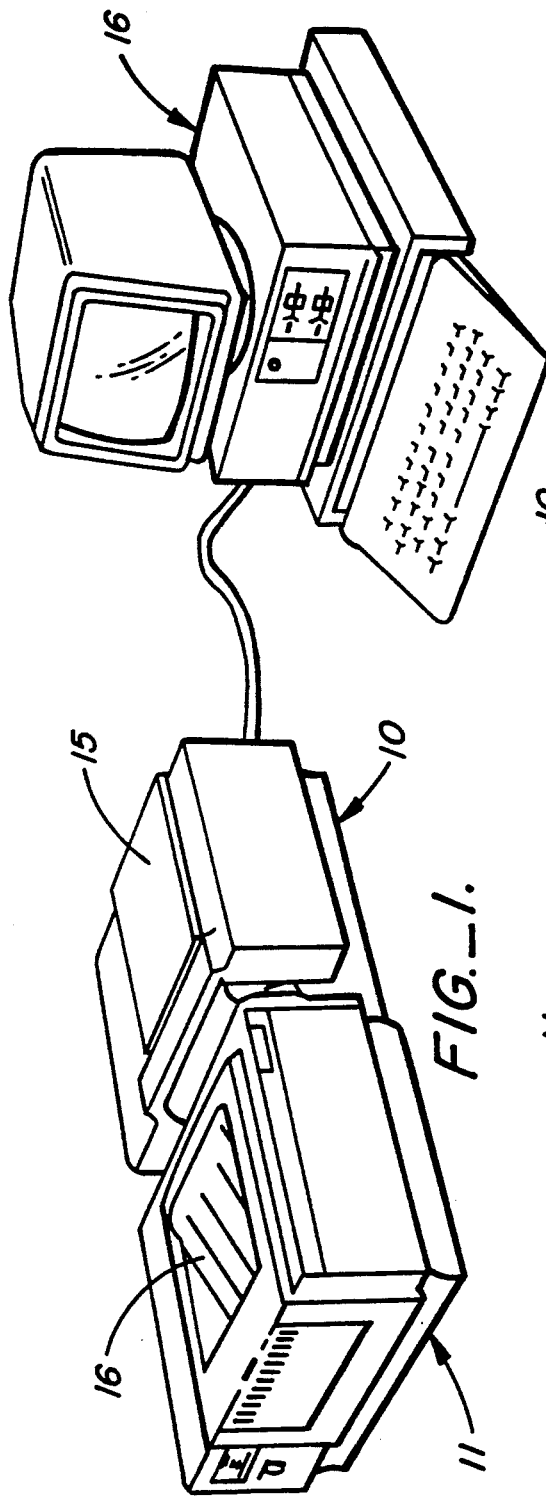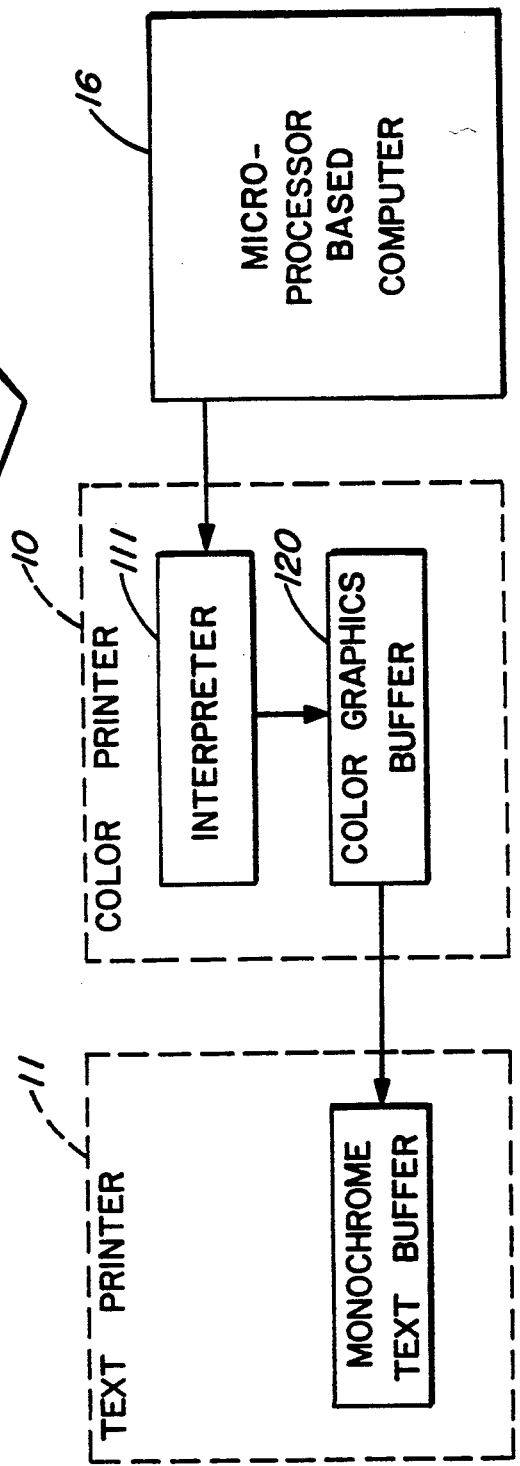

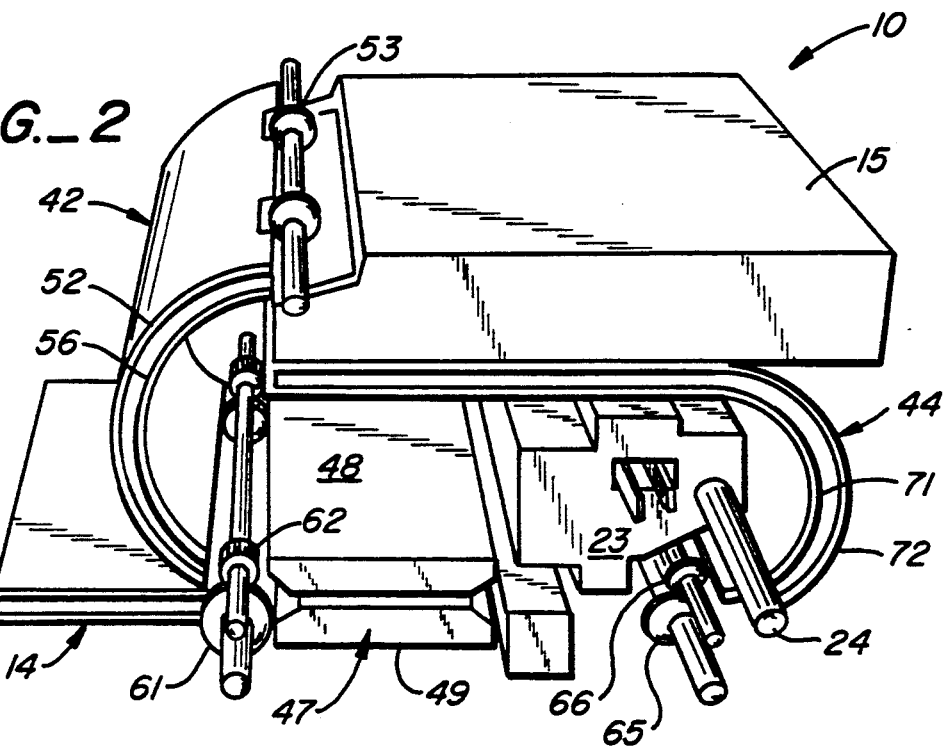
FIG._2
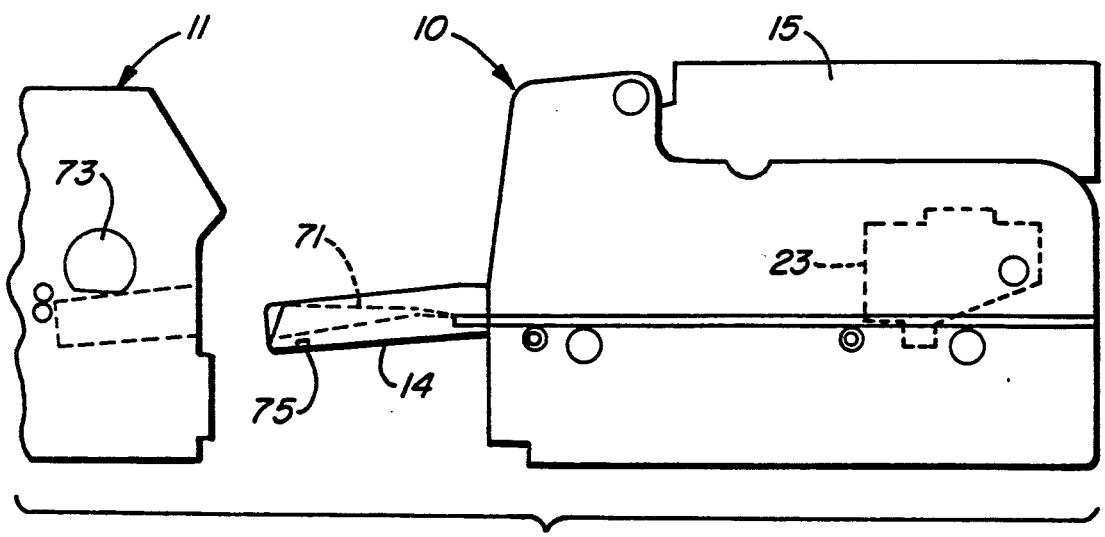
FIG._3

TEXT AND COLOR PRINTING SYSTEM

This is a continuation of copending application Ser. No. 07,248,886 filed on Sep. 23, 1988, now abandoned.

BACKGROUND OF THE INVENTION

1. Technical Field

The present invention generally relates to printing systems and, more particularly, to text and graphics printing systems for use with microprocessor-based computers.

2. Background Art

In conjunction with microprocessor-based computers, it is well known to employ so-called "desktop" printers that provide multi-color graphics. However, conventional desktop color printers have several shortcomings. For example, color printers of the electrophotographic type require complex and expensive mechanisms to sequentially form and align color frames. While some desktop color printing technologies, such as inkjet, are less complex than electrophotographic printing, those technologies do not provide the line acuity and speed desired for printing document quality text. On the other hand, high-quality monochrome text printing technologies for desktop use, notably laser printers, do not provide high-quality color graphics. Thus, it can be said that conventional desktop printers generally either print high-quality monochrome text or high-quality color graphics, but not both, at high speeds and low cost.

Accordingly, there exists a need for low-cost, high-speed desktop printers that can be used with microprocessor-based computers to print high-quality color graphics as well as high-quality monochrome text. The present invention, as explained in the following detailed description and accompanying drawings, provides a desktop printing system to satisfy the above-stated need.

SUMMARY OF THE INVENTION

To satisfy the above-stated need, the present invention provides a printing system for use with a microprocessor-based computer for sequentially printing color graphics and monochrome text on sheets. In the preferred embodiment, the printing system comprises a color printer for printing color graphics, a text printer for printing text, and means which detachably connect the color and text printers. The color printer can be, for example, of the inkjet type, the thermal transfer type, or the electrophotographic type. The monochrome text printer is preferably a laser-type printer. Further, the system includes interpreter means for receiving printing information from a microprocessor-based computer and for segregating the printing information into color information and monochrome information, and control means connected to the interpreter means to control the color printer to print color information and to control the text printer to print only monochrome information.

In one preferred embodiment, the color printer prints color graphics on sheets with generally incremental motion and includes a color graphics printing station, a sheet drying station, and sheet transport means which transports sheets in one direction through the dryer prior to printing and transports sheets in the opposite direction during and after color printing.

Further, the present invention provides a method for sequentially printing color graphics and monochrome text on sheets, comprising the following steps: feeding a sheet into a color printer, thermally pre-stabilizing the sheet, controlling printing information to print only color graphics on the sheet in the color printer, heating the printed sheet sufficiently to avoid ink smearing when the sheet is contacted by a drive wheel, delivering the heated sheet from the color printer to a text printer, and controlling printing information to print only monochrome text on the sheet in the text printer to produce a sheet having both text and graphics printed thereon.

BRIEF DESCRIPTION OF THE DRAWINGS

In the drawings:

FIG. 1 is a perspective view of one embodiment of a text and color graphics printing system according to the present invention;

FIG. 2 is a cutaway pictorial view that illustrates one embodiment of a color printer for use in the system of FIG. 1;

FIG. 3 is a side view, partially cutaway, of a color printer including a paper path extender for use in the system of FIG. 1; and FIG. 4 is a schematic diagram of one embodiment of a system for controlling the system of FIG. 1.

DETAILED DESCRIPTION OF THE PREFERRED EMBODIMENT

FIG. 1 generally shows a printing system comprising the modular combination of a color printer 10 operatively connected to a monochrome text printer 11 by a paper path extension 14. The illustrated system has a sheet input cartridge 15 at color graphics printer 10 and a sheet output station 16 at text printer 11. It should be understood that paper path extender 14 replaces the input paper tray normally used with text printer 11 and is removably disengageable from the text printer. It should also be understood that color printer 10 and monochrome text printer 11 are connected for control by a microprocessor-based computer 16.

In the preferred embodiment, color printer 10 is a self-contained unit whose print engine can be based on one of several technologies for printing color graphics. For example, color printer 10 can be a four-color inkjet printer, a thermal transfer printer, or electrophotographic printer to print color graphics. Typically, color printer 10 prints with incremental motion of a sheet of media, normally paper, and has the capability to optionally print monochrome text. (As used herein, the term monochrome means a single color which, in practice, is usually black.)

Monochrome text printer 11, likewise, is a conventional self-contained unit, such as, for example, a laser printer. Typically, text printer 11 prints monochrome text on sheets with continuous motion. Such continuous printing is provided, for example, in the Hewlett-Packard Laser Jet I and Laser Jet II printers available from Hewlett-Packard Corporation of Palo Alto, Calif.

Operation of the system of FIG. 1 will now be generally described. Normally color printer 10 extracts sheets one-by-one from cartridge 15, then prints only color graphics on each of the extracted sheets and, finally, delivers the color printed sheets sequentially to paper path extension 14. Then text printer 11 sequentially extracts sheets from extension 14, prints only monochrome text on the sheets and delivers finished pages, containing both monochrome text and color graphics, to output station 15.

FIG. 2 shows one embodiment of color printer 10 for use in the above-described system. In this embodiment, color printer 10 employs an ink-jet type print engine 23 which is mounted for translational motion on a guide bar 24. It should be understood that guide bar 24 is fixed to extend perpendicular to the direction of travel of a sheet through printer 10 and that a conventional drive mechanism, not shown, is connected to drive print engine 23 to reciprocate with back-and-forth motion along on the guidebar.

Further in the embodiment illustrated in FIG. 2, color printer 10 includes curved guide systems, generally designated by the numbers 42 and 44, which guide individual sheets back and forth past print engine 23 and then deliver the sheets to paper path extension 14. In the preferred embodiment, printer 10 also includes a dryer, generally designated by number 47, which heats sheets both before and after they are printed by print engine 23. The illustrated dryer 47 comprises parallel heater plates 48 and 49 that extend laterally across the width of the printer. Dryer 47 should also be understood to include guide members, not shown, which guide individual sheets between heater plates 48 and 49 without contacting at least the upper plate. In practice, the temperature of heater plates 48 and 49 is thermostatically controlled so that the printed sheets are not adversely affected by heat from the dryer.

Operation of color printer 10 of FIG. 2 will now be described. As the first step, a sheet of paper is extracted from cartridge 15 by pick-up rollers 53 and directed into guide system 42 between curved guide plates 55 and 56. At the end of the path defined by the guide plates 55 and 56, a sheet is engaged by secondary feed wheels 61 and pinch rollers 62 and driven generally continuously, not incrementally, between dryer plates 48 and 49 of dryer 47. In dryer 47, water absorbed by the sheet is evaporatively removed to prestabilize the sheet, i.e. to improve the sheet's dimensional stability for the purpose of enhancing print quality. Then, the leading edge of the sheet is driven below print engine 23 which, during this direction of sheet travel, does not print. Next, the sheet is engaged by main drive wheels 65 and associated pinch rollers 66. Normally, secondary feed wheels 61 release the sheet just as primary feed wheels 65 engage the sheet. Disengagement can be accomplished, for example, by photoelectrically detecting the presence of the sheet at primary feed wheels 65 and then using signals from the photoelectric detector to actuate a solenoid to release secondary pinch rollers 66.

As the next step in the operation of color printer 10 of FIG. 2, primary feed wheels 65 drive the sheet upwardly between curved plates 71 and 72 of curved guide system 44 until the trailing edge of the sheet reaches primary feed wheels 65. Then, the direction of sheet travel is reversed and primary feed wheels 65 drive the sheet downwardly toward print engine 23 and dryer 47. On this return path, printing of color graphics begins as the sheet passes beneath print engine 23. In usual practice, primary feed wheels 65 incrementally index a sheet between each change in printing direction of print engine 23 and the incremental indexing distance equals the ink swath width so that an apparently continuous color graphics images are formed longitudinally along the sheet even though motion of the sheet is incremental. As the sheet is indexed beneath print engine 23, the leading edge of the sheet advances between dryer plates 48 and 49. In dryer 47, ink on the sheet is dried sufficiently that the color graphics are not smeared when the sheet is engaged by secondary feed wheels 61 and by the drive means of subsequent text printer 11.

As sheets individually leave dryer 47, secondary feed wheels 61 direct the sheets into paper path extension 14. More particularly, in the illustrated embodiment, secondary feed wheels 61 re-engage the leading edge of a sheet just as the trailing edge of the sheet is disengaged by primary feed wheels 65. Then, secondary feed wheels 61 drive the sheet onto extension 14 until the leading edge of the sheet reaches an appropriate position for pick-up by text printer 10, whereupon secondary feed wheels disengage the sheet.

FIG. 3 shows color printer 10 disengaged from monochrome text printer 11 in order to display paper path extension 14. In the preferred embodiment, extension 14 is an open tray-like device that is configured to be accepted by text printer 11 just as its normal input paper tray. However, paper path extension 14 differs from conventional paper trays in that it is specifically designed to hold only a single sheet rather than multiple sheets. For that purpose, extension 14 can include, for example, a selectively pivotal false bottom member 71 which is spring biased to present a single sheet to extraction roller 73 in text printer 11.

Mounted within extension 14 is one or more photosensors 75 to detect when a sheet has been delivered to the extension and when a sheet has been picked up from the extension by text printer 10. Where there is a difference in operating speeds between color printer 10 and text printer 11, signals from photosensors 75 are used to inhibit operation of color printer 10 so that two sheets do not occupy extension 14 at the same time. That is, signals from photosensor 75 are used to prevent color printer 10 from printing a second sheet while a first sheet remains in extension 14 awaiting pickup by text printer 11.

As relates to color printer 10, paper path extension 14 is designed to replace the conventional output tray without modification to the printer. Thus, the exact configuration of paper path extension 14 will differ depending upon the make and model of the color printer to which it is mated. Likewise, the exact configuration of paper path extension 14 will differ depending upon the make and model of the text printer which is to receive the extension.

FIG. 4 shows a system for electronically controlling color graphics printer 10 and text printer 11 to print information provided by the microprocessor-based computer 16. Preferably, the printing control circuitry is located within color printer 10. By so locating the control circuitry, text printer 11 can be connected to color printer 10 in the same manner as it would otherwise be connected to computer 16 and, also, computer 16 can be connected only to color printer 10.

In the system of FIG. 4, an interpreter 111 is preferably, but not necessarily, located in the program memory of color graphics printer 10 and connected to computer 16 by, for example, a Centronics parallel interface port. The interpreter 111 can be, for example, a programmable microprocessor such as a Motorola 68000 microprocessor. Further in the system, interpreter 111 is connected to a first data storage buffer 120 in color printer 10 and to a second data storage buffer 121 in text printer 11.

In operation of the control system of FIG. 4, interpreter 111 receives data from computer 16 for both color printer 10 and text printer 11. Concurrently, interpreter 111 segregates the data into color graphic and monochrome text components. Normally, such segregation is accomplished by reading Printer Command Language (PCL) commands which are issued by computer 16 when it outputs blocks of text and graphics data. (Typically, each block of data is normally preceded by a command header that designates the size and data type of the block.) After data is segregated into monochrome and color components, interpreter 111 directs the color components to storage buffer 120 in color printer 10 and directs the monochrome components to storage buffer 121 in text printer 11. Then, the monochrome and color data are used by text printer 10 and color printer 11, respectively, as previously described.

In the preferred embodiment, interpreter 111 also controls color printer 10 and the printing sequence. The printing sequence can be controlled, for example, by using "end of page" commands to initiate text printing.

It can now be appreciated that the above-described modular combination of color printer 10 and text printer 11 provides both high-quality color graphics and high-quality text on the same sheet without sacrificing printing speed. Also, a user of the system can selectively use either of the printers without the other by merely detaching the paper path extender 14. Still further, the system allows an owner of a text printer to easily upgrade to a text-and-color system by simply adding a color printer with a paper path extension without having to purchase a combination text-and-color printer.

While the present invention has been illustrated and described in accordance with a preferred embodiment, it should be recognized that variations and changes may be made therein without departing from the invention as set forth in the following claims. For example, although color printer 10 precedes laser printer 11 in the system of FIG. 1, the sequence can be reversed. Also, although color printer 10 has been described as typically printing with incremental motion of the printed media, the printer could be of the type which prints color graphics with continuous motion.

What is claimed is:

1. A desktop printing system for use with a microprocessor-based computer for selectively and sequentially printing color graphics and monochrome text on a print media such as a sheet of paper, the printing system comprising:
   a color printer for selectively printing color graphics on a sheet of the print media upon receiving information;
   a text printer for sequentially and separately printing text on the same sheet of the print media upon receiving information;
   an interconnection means that mechanically and detachably connects together the color printer and the text printer to, thereby, provide a continuous path for sheets of the print media to follow when moving between the color printer and the text printer;
   an interpreter means for receiving printing information from the microprocessor based computer and for segregating the printing information into color information and monochrome information; and
   a control means connected to the interpreter means to control the color printer to print only color graphic information and to control the text printer to print only monochrome information.

2. A printing system according to claim 1 wherein the color printer comprises a printer of the inkjet type; and a sheet dryer means is included as part of the color printer for drying a sheet of the print media before and after printing with color graphics.

3. A printing system according to claim 1 wherein the color printer includes sheet dryer means for drying a sheet of the print media both before and after application of the color graphic ink.

4. A printing system according to claim 1, wherein the color printer prints color graphics with incremental motion so the color graphics appears visually as one continuous graphic lacking lines showing successive application of ink, and the text printer prints text with continuous motion.

5. A desktop printing system for use with a microprocessor-based desktop computer to selectively print color graphics and at least a portion of a monochrome text on a plurality of print media such as sheets of paper, the printing system comprising:
   a color graphics printer having a printing means to print with incremental motion;
   a monochrome text printer for sequentially and separately printing text on the same sheet as the color graphics printer prints graphics, the text printer having printing means to print with continuous motion;
   a mechanical interconnection means which detachably connects together the color printer and the text printer; and
   an information control means which receives printing information from a microprocessor-based computer and which segregates the received information into color and monochrome components and then controls the color graphics and text printers to, respectively, print only the segregated color and monochrome components.

6. A printing system according to claim 5, wherein the color printer is an inkjet color printer.

7. A printing system according to claim 5, wherein the color printer is a thermal transfer printer.

8. A printing system according to claim 5, wherein the color printer is an electrophotographic color printer.

9. A printing system according to claim 5, wherein the text printer is a laser printer.

10. A printing system according to claim 5 wherein the color graphics printer includes a sheet drying means operative to dry a sheet prior to printing.

11. A printing system according to claim 10 wherein the sheet drying means is connected to dry a sheet after printing as well as before printing.

12. A printing system according to claim 11 wherein the color graphics printer includes sheet transport means connected to transport a sheet through the drying means in one direction prior to printing and in the opposite direction during and after printing.

13. A system for use with microprocessor-based desktop computers for serially printing color graphics and monochrome text on a plurality of sheets of a print media such as individual sheets of paper, the system comprising:
   a color printer for printing color graphics on the sheets of paper with incremental motion, the color printer including:
      (i) a color graphics printing station;
      (ii) a sheet drying station; and (iii) a sheet transport means (1) for transporting the sheets of paper in one direction through the dryer prior to printing and (2) for transporting the sheets of paper through the dryer in the opposite direction during and after color printing;

a text printer for sequentially and separately printing text on the sheets of paper, the text printer being operable to print text on the sheets of paper with continuous motion;

a mechanical interconnection means which detachably connects together the color printer and the text printer so that individual ones of the sheets of paper are delivered from one of the printers to the other along an uninterrupted paper sheet flow path; and a control means (1) for segregating color information from monochrome information, (2) for using only color information for printing in the color printer and (3) for using only monochrome information for printing in the text printer.

14. A system according to claim 13 wherein the color printer is of the inkjet type.

15. A system according to claim 13 wherein the color printer is of the thermal transfer type.

16. A printing system according to claim 13 wherein the color printer is of the electrophotographic type.

17. A printing system according to claim 13 wherein the text printer is a laser printer.

18. A printing system according to claim 13 wherein the control means includes at least one sensor for sensing travel of sheets on the interconnection means and for signalling the text printer to inhibit printing operations.

19. The system of claim 13, wherein the sheet transport means incrementally indexes sheets through the color graphics printing station in the printing direction and continuously feeds sheets in the non-printing direction.

20. The system of claim 13, wherein the dryer includes parallel plates mounted to heat opposed sides of a travelling sheet.

21. A method for use with a microprocessor-based desktop computer for separately printing color graphics and monochrome text in response to commands from the computer, comprising the steps of:
  feeding a sheet into a first one of a color printer and a text printer;
  in response to the commands from the computer, executing a first printing operation on the sheet in the first one of the printers;
  delivering the sheet from the first one of the printers to the second one of the printers; and
  in response to other ones of the commands from the computer, executing a second printing operation on the sheet in the second one of the printers for sequentially and separately printing text on the same sheet as the color graphics printer prints graphics.

22. A method according to claim 21 wherein the first one of the printers is a color printer and the second one of the printers is a monochrome text printer, and including the steps of segregating printing information into color graphics information and text information, and providing only the text information to the text printer for printing and only the color graphics information to the color printer for printing.

23. A method for separately and selectively printing, onto a print medium such as a sheet of paper, color graphics and at least a portion of a monochrome text in response to a plurality of commands from a microprocessor-based desktop computer, the method comprising the steps of:
  feeding the print medium in response to an instruction received from the computer;
  printing only a color graphic on the medium in the color printer, the color printer printing the color graphic in response to the instruction received from the computer;
  delivering the medium from the color printer to the text printer upon receiving the instruction from the computer that the color printer has completed the color graphic; and
  sequentially and separately printing only text on the medium in the text printer in response to an instruction received from the computer.

24. A method according to claim 23 including the steps of segregating printing information into color graphics information and text information, and providing only the text information to the text printer for printing and only the color graphics information to the color printer for printing.

25. A method according to claim 23 wherein the color printer prints incrementally and the text printer prints continuously.

26. A method according to claim 23 wherein a sheet is heated in the color printer both before and after printing.

27. A method according to claim 23 wherein the color printer prints with an inkjet engine.

28. A method according to claim 23 wherein the color printer prints by thermal transfer.

29. A method according to claim 23 wherein the color printer prints by electrographic techniques.

30. A method according to claim 23 wherein the text printer prints by laser printing techniques.

31. A method for sequentially printing color graphics and monochrome text sheets, comprising the steps of:
  feeding a sheet into a color printer;
  thermally pre-stabilizing the sheet;
  controlling printing information to print only color graphics on the sheet in the color printer;
  after printing color graphics, heating the printed sheet sufficiently to avoid ink smearing when the sheet is contacted by a drive wheel;
  driving the heated sheet from the color printer to a text printer; and
  controlling the printing information to print only monochrome text on the sheet in the text printer, thereby producing the sheet having both text and graphics printed thereon.

32. A method according to claim 31 including the steps of providing text and color graphics information to the color printer, then segregating the information into color graphics information and monochrome text information, and using only monochrome text information to print in the text printer and only color graphics information to print in the color printer.

33. A method according to claim 31 including the steps of:
  transporting sheet generally continuously in one direction through a dryer prior to color printing and incrementally indexing sheets through the dryer in the opposite direction during and after coilor printing.

* * * * *